(12) United States Patent
Chen

(10) Patent No.: US 11,465,219 B2
(45) Date of Patent: Oct. 11, 2022

(54) FOLDING HANDLE FOR TOOLS AND TOOLS HAVING FOLDING HANDLES

(71) Applicant: JS Products, Inc., Las Vegas, NV (US)

(72) Inventor: Chungeng Chen, Las Vegas, NV (US)

(73) Assignee: JS Products, Inc., Las Vegas, NV (US)

( * ) Notice: Subject to any disclaimer, the term of this patent is extended or adjusted under 35 U.S.C. 154(b) by 0 days.

(21) Appl. No.: 17/161,063

(22) Filed: Jan. 28, 2021

(65) Prior Publication Data

US 2021/0229192 A1   Jul. 29, 2021

Related U.S. Application Data

(60) Provisional application No. 62/967,154, filed on Jan. 29, 2020.

(51) Int. Cl.
  *B23D 29/02*   (2006.01)

(52) U.S. Cl.
  CPC .................................. *B23D 29/023* (2013.01)

(58) Field of Classification Search
  CPC .......... B23D 29/023; B25G 1/06; B25G 1/04; B25G 1/043; B25G 1/066; B26B 17/02; B26B 13/00; B25F 1/04; B25F 1/006; A01G 3/0255; A01G 3/04; A01G 3/083
  USPC ... 30/92, 153, 341, 255, 143, 151, 154, 152, 30/330, 331, 155; 81/427.5, 177.6, 177.2, 81/177.4, 177.7, 415; 7/106, 118, 7/125–135, 167, 168
  See application file for complete search history.

(56) References Cited

U.S. PATENT DOCUMENTS

| | | | | |
|---|---|---|---|---|
| 1,417,683 A | * | 5/1922 | Parsons | B25B 13/481 81/177.2 |
| 1,461,270 A | * | 7/1923 | Garrison | B25G 1/043 81/427.5 |
| 2,989,100 A | * | 6/1961 | Burdis | B26B 23/00 30/308.2 |
| 9,770,820 B1 | * | 9/2017 | Ragner | B25F 1/04 |
| 10,201,131 B1 | * | 2/2019 | Huang | B25G 3/38 |
| 10,343,295 B2 | * | 7/2019 | Feuerstein | B25G 1/04 |
| 2004/0010924 A1 | * | 1/2004 | Hung | B26B 13/005 30/255 |
| 2005/0246900 A1 | * | 11/2005 | Simpson | A01G 3/02 30/153 |
| 2005/0283982 A1 | * | 12/2005 | Menter | B25G 1/08 30/153 |
| 2012/0304473 A1 | * | 12/2012 | Panosian | B26B 17/02 30/192 |
| 2013/0205601 A1 | * | 8/2013 | Wu | A01G 3/0475 30/255 |

* cited by examiner

*Primary Examiner* — Ghassem Alie
(74) *Attorney, Agent, or Firm* — Weide & Miller, Ltd.

(57) ABSTRACT

A folding handle for a tool has a main handle having a tool head, a handle extension rotatably connected to the main handle, the handle extension rotatable between a first extended position and a second folded position relative to the main handle, and a latching mechanism having a locking pin and an actuator connected to the locking pin and movable between a first position in which the locking pin engages the handle extension, preventing movement of the handle extension relative to the main handle, and a second position in which the locking pin is disengaged from the handle extension, allowing movement of the handle extension relative to the main handle. A tool may have first and second folding handles which are movably connected to one another.

18 Claims, 7 Drawing Sheets

FOLDING HANDLE FOR TOOLS AND TOOLS HAVING FOLDING HANDLES

RELATED APPLICATION DATA

This application claims priority U.S. Provisional Application Ser. No. 62/967,154, filed Jan. 29, 2020, and incorporates by reference said application as if set forth fully herein.

FIELD OF THE INVENTION

The present invention relates to tools having one or more handles.

BACKGROUND OF THE INVENTION

Some tools such as some types of bolt or cable cutters or crimping/swagging tools require long handles to allow a user to have a sufficient mechanical advantage to perform a task. That is, to cut through some bolts or cables, or to crimp/swag some heavy metal ferrules, a large force is required. The long handles of such tools amplify the force of the user through mechanical advantage to perform the task.

Large tools, however, are cumbersome to store and transport. Accordingly, some examples of these types of tools include folding handles. This allows for easier storage and transport of the tools. However, such folding mechanisms in the handles increases the complexity of the tool and may result in failure of the handle when the handle is subjected to large loads. Further, the complexity may prohibitively increase manufacturing costs.

SUMMARY OF THE INVENTION

Aspects of the invention comprising a folding handle, such as for a tool, a tool having one more folding handles, and methods for using a folding handle.

In one embodiment, a folding handle, such as for a tool, comprises a main handle having a proximal end and a distal end, a tool head located at the proximal end, a handle extension having a proximal end and a distal end, the proximal end of the handle extension rotatably connected to the distal end of the main handle, the handle extension rotatable between a first extended position and a second folded position relative to the main handle, and a latching mechanism, the latching mechanism comprising a locking pin and an actuator connected to the locking pin, the actuator movable between a first position in which the locking pin engages the handle extension, preventing movement of the handle extension relative to the main handle, and a second position in which the locking pin is disengaged from the handle extension, allowing movement of the handle extension relative to the main handle.

In one embodiment, a tool comprises first and second handles which are movably connected to one another, each handle comprising a main handle having a proximal end and a distal end, a tool head located at the proximal end, a handle extension having a proximal end and a distal end, the proximal end of the handle extension rotatably connected to the distal end of the main handle, the handle extension rotatable between a first extended position and a second folded position relative to the main handle, and a latching mechanism, the latching mechanism comprising a first locking pin and an actuator connected to the locking pin, the actuator movable between a first position in which the locking pin engages the handle extension, preventing movement of the handle extension relative to the main handle, and a second position in which the locking pin is disengaged from the handle extension, allowing movement of the handle extension relative to the main handle.

In one embodiment, the locking pin is mounted for linear movement on the main handle, such as along a guide.

In one embodiment, the handle extension has at least one first notch and at least one second notch, wherein when the locking pin engages the at least one first notch, the handle extension is retained in its extended position and wherein when the locking pin engages the at least second notch, the handle extension is retained in its folded position.

In one embodiment, the actuator comprises a lever which is pivotally connected to the main handle.

Relative to a tool having first and second connected folding handles, the locking pins and actuators may be located on an inside of the folding handles and the handle extensions may be configured to fold towards the outside of each main handle towards the tool heads.

In one embodiment, the distal end of the handle extension is configured as a grip for a user of the tool.

Further objects, features, and advantages of the present invention over the prior art will become apparent from the detailed description of the drawings which follows, when considered with the attached figures.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a configuration of a folding handle. The folding handle configuration may be used in conjunction with a tool, such as a hand-operated tool having one or more handles.

Figure 1:
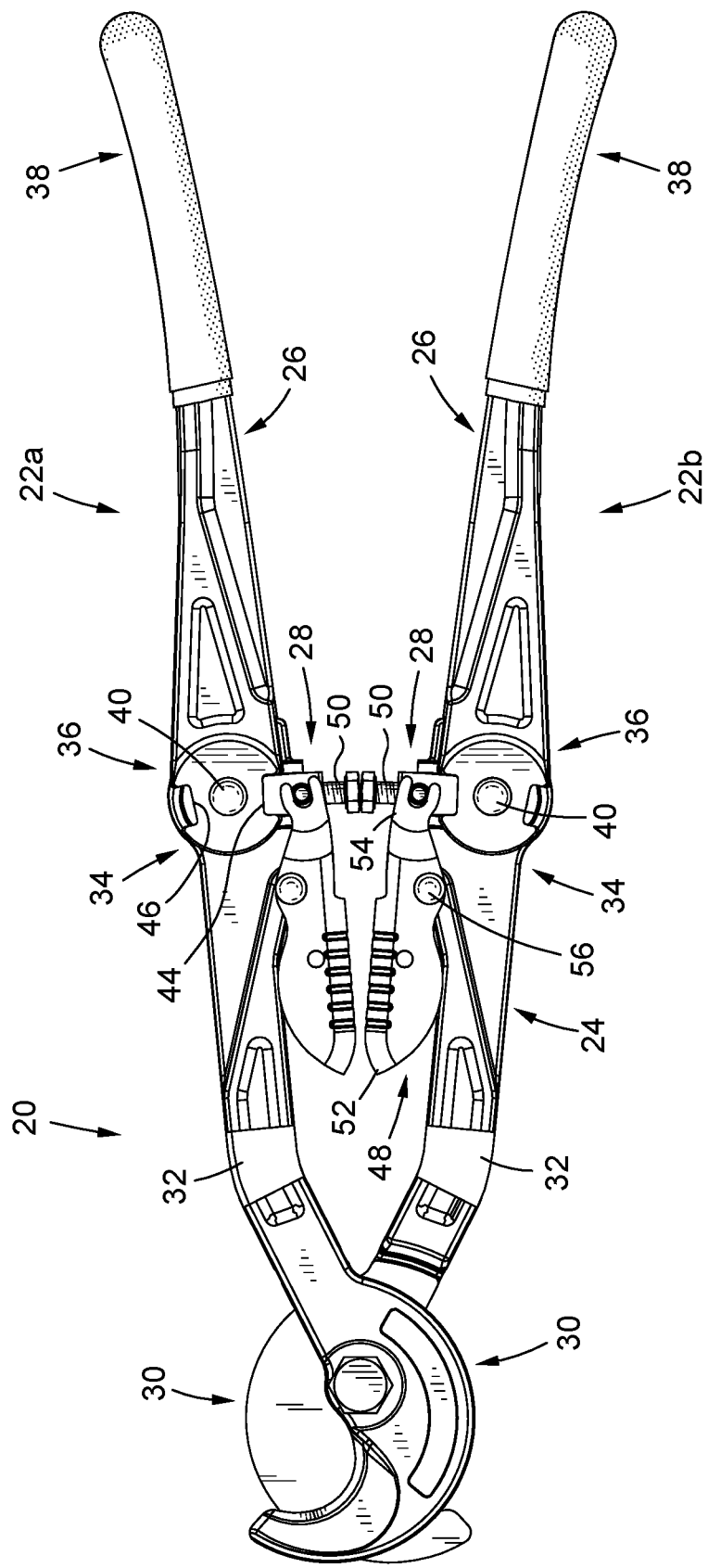
FIG. 1 shows a tool with folding handles in an unfolded position, according to one exemplary embodiment.

FIGS. 1-4 show a tool 20 with a folding handle according to one exemplary embodiment. The tool 20 shown in FIG. 1 is configured as a cable cutter and has two handles 22a,b. However, as described herein, the folding handle of the present application may be applied to other tools, including tools with as few as one handle or more than two handles, and may be applied to tools having one folding handle and one or more handles having other configurations.

In one embodiment, each folding handle 22a,b comprises a main handle 24, a handle extension 26, and a latch 28. Each main handle 24 has a head portion 30 and a body 32. The head portion 30 may be formed integral to the body 32, or be connected thereto. The configuration of the head portion 30 may vary, such as based upon the type of tool. In the embodiment illustrated, the head portions 30 comprise cutting heads for cutting cables.

In the embodiment illustrated, the folding handles 22a,b are connected. For example, the folding handles 22a,b may be connected at the head portions 30 so that the head portions 30 may be moved away from one another (such as to receive a cable therebetween) and towards one another (to pinch and cut the cable).

The body 32 portion of each main handle 24 extends form the head portion 30. As illustrated, the body 32 of each main handle 24 may have various shapes, including one or more bends or offset portions, such as for receiving portions of the latch 28 and otherwise separating the handles from one another (thus permitting a user to grip them).

The body 32 of the main handle 24 has a distal end 34. In one embodiment, the distal end 34 is generally opposite the head portion 30. As described in more detail below, the distal end 34 of the body 32 of the main handle 24 may form a stop.

Figure 3:
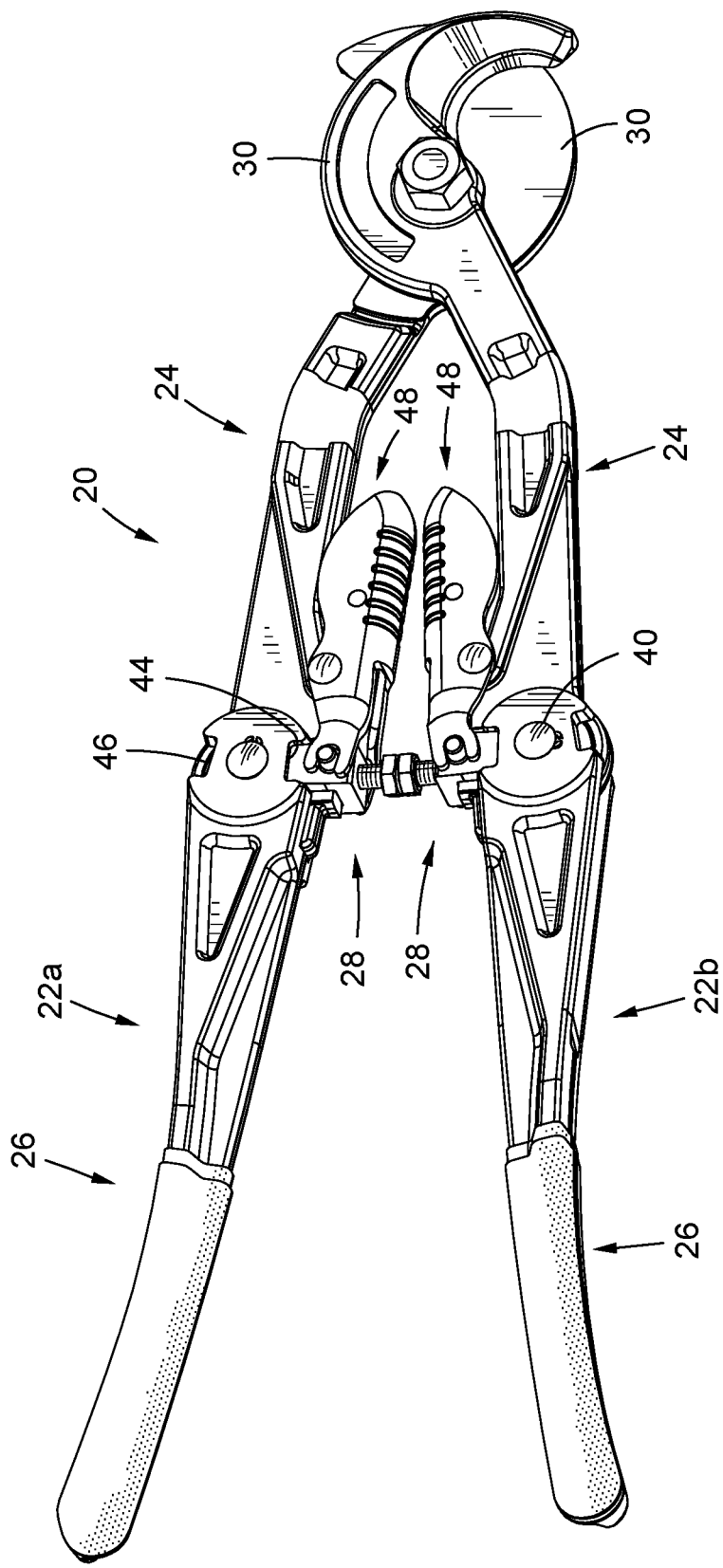
FIG. 3 shows another view of the tool of FIG. 1.
Figure 4:
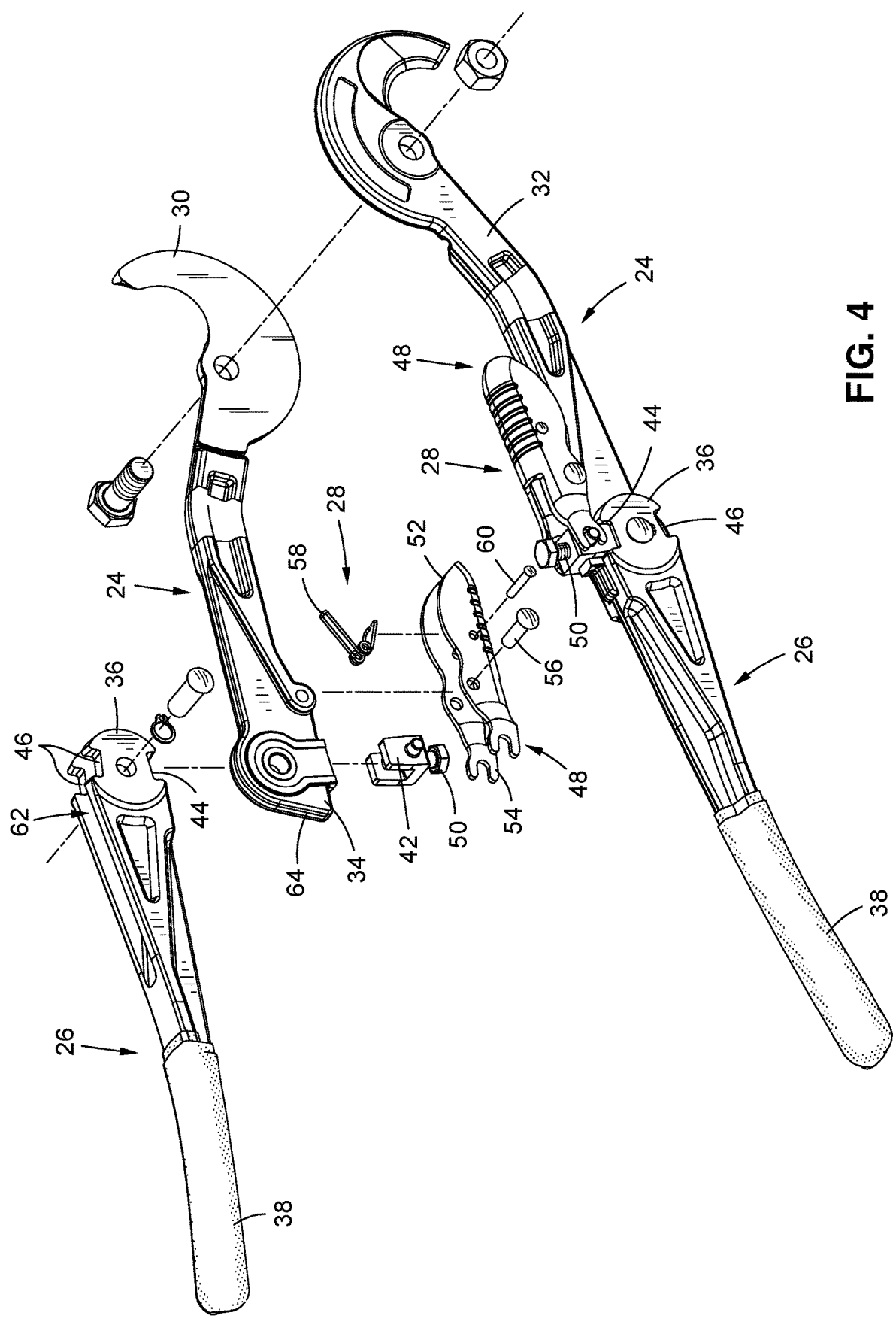
FIG. 4 shows a partially exploded view of the folding handle of the tool of FIG. 1.

As best illustrated in FIGS. 1, 3 and 4, the handle extension 26 has a first or proximal end 36 and a second or distal end 38. The handle extension 26 is movably connected to the main handle 24. In one embodiment, the proximal end 36 of the handle extension 26 is connected to the distal end 34 of the main handle 24. The distal end 38 of the handle extension 26 may be formed as a grip, such as including a covering, being shaped for receiving the hand of a user, etc.

Figure 2:
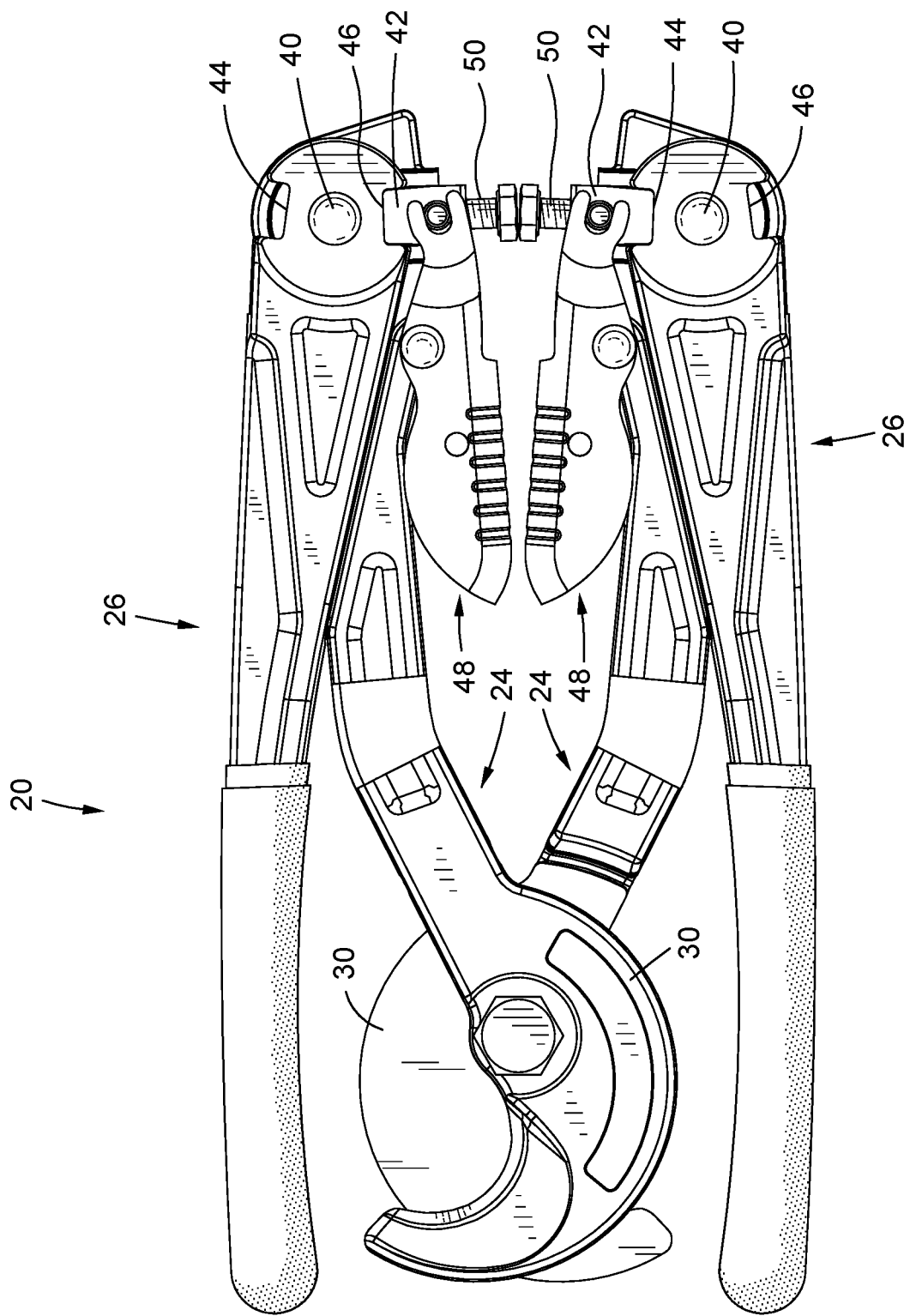
FIG. 2 shows the tool of FIG. 1 with the folding handles in a folded position.

As indicated, the handle extension 26 is connected to the main handle 24. More particularly, as described below, the handle extension 26 is preferably rotatably connected to the main handle 24 at the distal end 34 of the body 32. As illustrated in FIGS. 1 and 2, this allows the folding handles 22a,b to be moved between an extended position and a retracted or folded position. In the extended position, the handle extensions 26 are generally aligned with the body 32 of the main handle 24, thus effectively increasing the length of the main handle 24, and whereby the tool 20 has a first length. In the retracted or folded position, the handle extension 26 generally extend towards the head portion 30 of the main handle 24, causing the overall length of the tool 20 from one end to the other, to be a second length which is greatly reduced from the first length.

As described in more detail below, in the first or extended position, the folding handles 22 are configured to be gripped and used by a user. In the second or folded position, the storage and transport of the tool 20 is facilitated due to the smaller dimension of the tool. In the example of cable cutters, such as 18" or 24" cable cutters, or other similar tools, the folding of the handles may allow the tool to easily fit into a storage well of a truck or car door.

In one embodiment, the handle extension 26 is pivotally or rotatably connected to the main handle 24 via a pivot pin 40. The pivot pin 40 may pass through aligned apertures in the distal end 34 of the main handle 24 and the proximal end 36 of the handle extension 26.

In one embodiment, at least one means is provided for controlling the position of the handle extension 26 relative to the main handle 24, such as to selectively retain the position of the handle extension 26 in the extended position or the folded position. In one embodiment, the means comprises the latch 28.

As best illustrated in FIG. 4, the latch 28 may comprise a locking pin 42 and an actuator 48. The locking pin 42 may be configured to selectively engage one or more slots or notches 44,46, and the actuator 48 may comprise and a control lever 49. In one embodiment, the locking pin 42 is associated with the distal end 34 of the main handle 24. The locking pin 42 is preferably configured for movement towards and away from the handle extension 26. In one embodiment, the locking pin 42 comprises a body which is mounted on a guide 50. The guide 50 may be connected to the main handle 24 and, as illustrated, extend towards an inside of the tool 20 (where the tool has two handles, towards the other handle). The guide 50 might comprise, for example, a bolt or similar body which threadingly engages the main handle 24 and has a head at an opposing end, such that the locking pin 42 and is thus configured for linear movement along the guide 50

The locking pin 42 is selectively configured to engage the handle extension 26, and preferably, the notches 44,46. In one embodiment, the notches 44,46 are inwardly extending recesses or set-backs in the proximal end 36 of the handle extension 26. The notches 44,46 may be located approximately 180 degrees apart from one another, or in generally opposing positions or sides of the handle extension 26. As detailed below, the first notch 44 may be located so that when the locking pin 42 is accepted therein, the handle extension 26 is in its extended position, and the second notch 46 may be located so that when the locking pin 42 is accepted therein, the handle extension 26 is in its folded position.

As indicated, the locking pin 42 is configured for movement towards and away from the notches 44,46, such as from a position where the locking pin 42 is moved outwardly and does not engage one of the notches, to a position where the looking pin is moved inwardly and engages one of the notches. In one embodiment, means may be provided for moving the locking pin 42. The means may comprise, for example, the actuator 48. As indicated, the actuator 48 may comprise a control lever 49 having a first end 52 and a second end 54. The first end 52 may be connected to the locking pin 42. The first end 52 of the control lever 49 may include projections which extend to opposing sides of the locking pin 42 and engage pins or rods 56 extending therefrom.

The control lever 49 preferably extends away from the locking pin 42 towards the head 30 of the main handle 24. In one embodiment, the control lever 49 is pivotally connected to the main handle 24 between its first end 30 and second end 34. In one embodiment, the actuator 48 is biased to a closed position, that being a position which biases the locking pin 42 towards the handle extension 26. In one embodiment, a means is provided for biasing the control lever 49. As illustrated in FIG. 4, this means may comprise a spring 58 which engages the control lever 49. For example, the spring 58 may be mounted to the control lever 49 via a mount 60 (such as a rod or pin) and be positioned between the control lever 49 and the main handle 24, thus biasing the portion of the control lever 49 which is opposite of the pivot point from the portion that engages the locking pin 42.

In one embodiment, a force transfer mechanism is provided for aiding in the transfer of force applied to the handle extension 26 to the main handle 24. This force transfer mechanism may comprise a face 62 associated with the handle extension 24 and a stop 64 associated with the main handle 24. The face 62 preferably comprises a surface of the handle extension 26 which faces the stop 64 of the main handle 24 when the handle extension 26 is in its extended position. As illustrated, when the handle extension 26 defines a pair of extensions that each define the notches 44,46 and which accept the distal end of the main handle 24 therebetween, the face 62 may be located between those extensions. The stop 64 may comprise a surface of the distal end 34 of the main handle 24.

In one embodiment, when the tool 20 includes two handles 22a,b, the main handles 24 each have a first side, such as in inside, and a second side, such as an outside. The latches 28 are located at the first or inside of each of the main handles 24. The handle extensions 26 are configured to fold outwardly and extend along the outside of each of the main handles 24.

Use

Additional aspects of the invention will be appreciated from a description of the method of use thereof.

Relative to the embodiment tool 20 illustrated in FIGS. 1 and 2, in order to fold each of the handle extensions 26 from the unfolded position to the folded position, the user actuates the actuator 48. In particular, the user depresses the second end 54 of the control lever 49 of the associated latch 28 (pushing it inwardly towards the associated main handle 24 against the force of the spring 58). This motion of the control lever 49 causes the control lever to rotate about the rod 56, causing the first end 52 of the control lever 49 to move upwardly (away from the main handle 24), pulling the associated locking pin 42 out of the notches 44 in the handle extension 26 (and the locking pin 42 slides along the guide 50), thus unlocking the latch. The user may then rotate the handle extension 24 from the position illustrated in FIG. 2 to the position illustrated in FIG. 1—namely, the extended position. The user may then release the control lever 49, thus allowing the control lever 49 to bias the locking pin 42 into the associated notches 46 of the handle extension 26. The process is repeated in reverse to return the handle extensions 24 to the unfolded position.

Notably, when the handle extensions 26 are in their extended position, a force which is applied to the handle extension 26 is transmitted through the face 62 thereof into the stop 64 of the main handle 24, and thereon to the head 30. In this manner, latch 28 is not required to burden the applied force, or at least all of the applied force, thus lessening the chance of the latch 28 releasing or breaking.

The elements of the tool 20, such as the main handle 24, handle extensions 26, locking pins 42, etc. may be formed from various materials and in various manners. For example, the main handle 24 and handle extensions 26 may be formed from a steel alloy in a forging process. In another embodiment, to decrease the weight of the tool, elements of the tool 20 such as the handle extensions 26, might be formed from aluminum.

Figure 5:
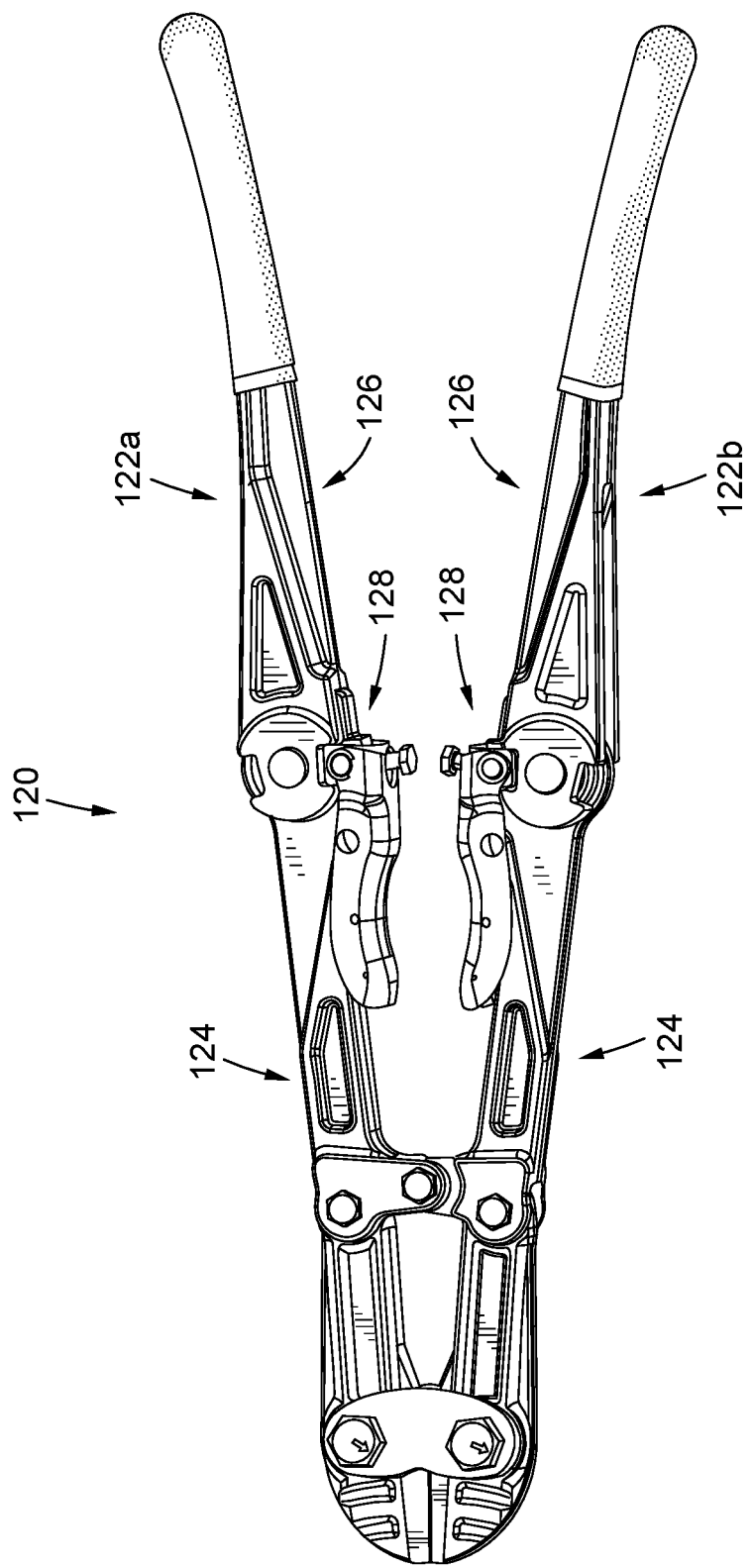
FIG. 5 shows another exemplary tool with folding handles in the unfolded position.
Figure 6:
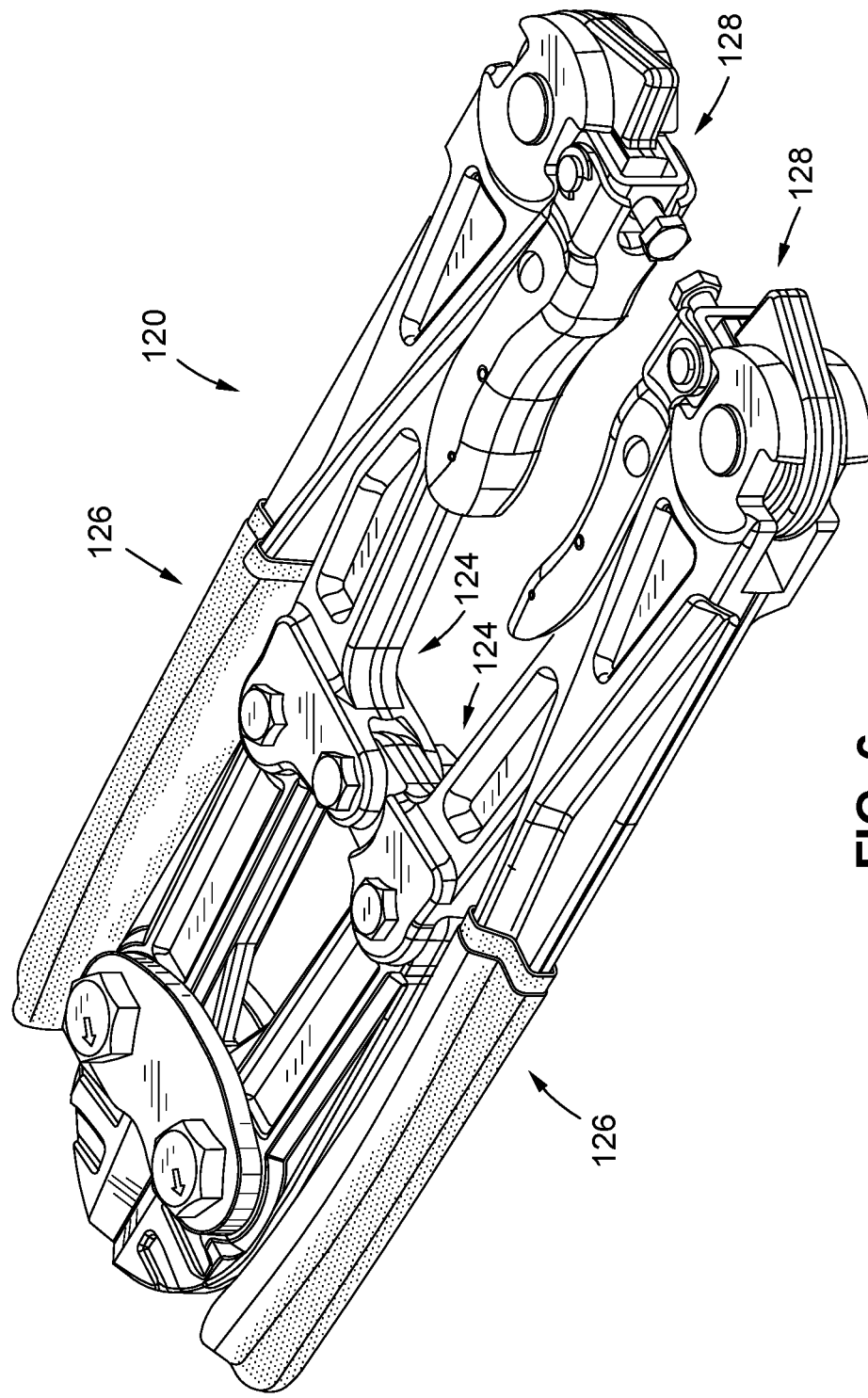
FIG. 6 shows the tool of FIG. 5 with the folding handles in the folded position.

While FIGS. 1-4 show a tool 20 of the invention as configured as a cable cutting tool, the tool might have various other configurations. For example, in another embodiment as illustrated in FIGS. 4-5, a tool 120 of the invention may be configured as a bolt cutter. In accordance with this embodiment, the tool 120 again comprises two foldable handles 122a,b, with each handle comprising a main handle 124 and a handle extension 126. Again, a latch 128 is provided for selectively controlling the position of the handle extension 126 relative to the main handle 124. In this embodiment, the head of each handle 122a,b has a different head (including a different connection), for use as a bolt cutter. It is also possible for the tool of the invention to only have one handle or more than two handles. For example, a digging element, rake or the like that is provided with a single handle might include a handle extension in accordance with the present invention.

In one embodiment, the handle extension 26 has a proximal end 36 which defines a pair of extensions or legs for receiving the distal end 34 of the main handle 24 therebetween. However, the handle extension 26 could simply have one portion which includes the notches 44,46 and which attaches to the distal end 34 of the main handle 24. Preferably, the handle extension 26 would still include an associated face 62 for engaging the stop 64 of the main handle 24. In other embodiments, the main handle 24 might include a pair of extensions and the proximal end 36 of the handle extension 26 (with the notches 44,46 therein) might be located between those extensions.

Other actuators or means might be provided for actuating the locking pins 42 other than a control lever 49. For example, the locking pins 42 might be spring loaded, such as with a coil spring located on the guide 50, and where the user might grab a tab or the like associated with the locking pin 42 in order to pull it outwardly against the coil spring into an unlatched position.

Means for biasing other than springs may be utilized, such as compressible materials or the like.

Figure 7:
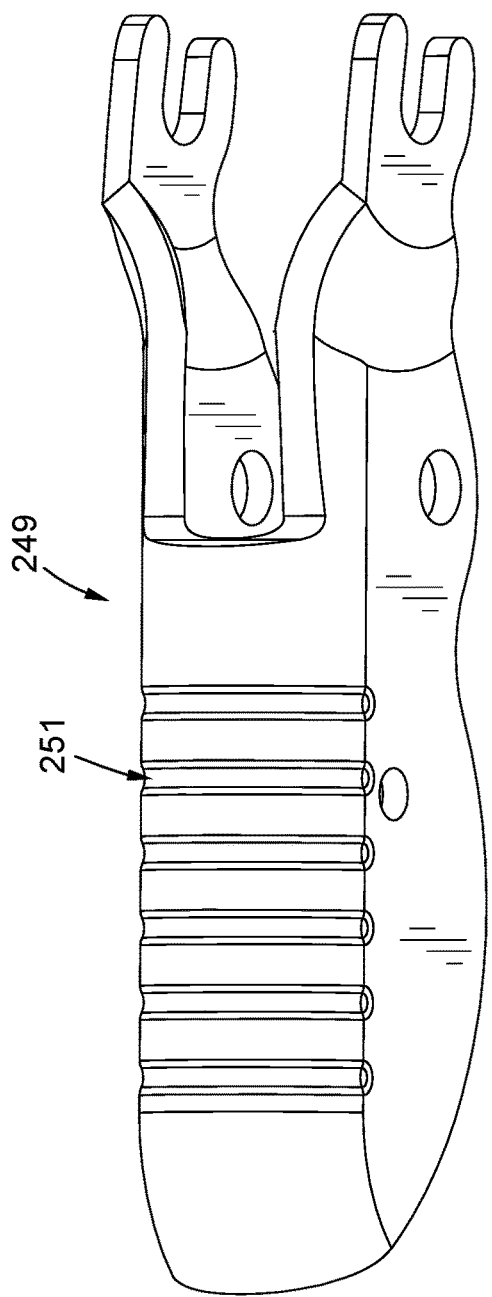
FIG. 7 shows a latching portion of a tool with folding handles, according to an exemplary embodiment.

FIG. 7 shows another embodiment of a control lever 249. Here, to enable the control lever 249 to be more easily actuated by a user, it may include indentations 251 that act as grips or otherwise serve to increase the grip/friction between a user and the control lever. Of course, the control lever 249 might alternatively, or in addition, include a grip (such as a coating applied to the lever), knurling or the like, for similar purposes.

Figure 8:
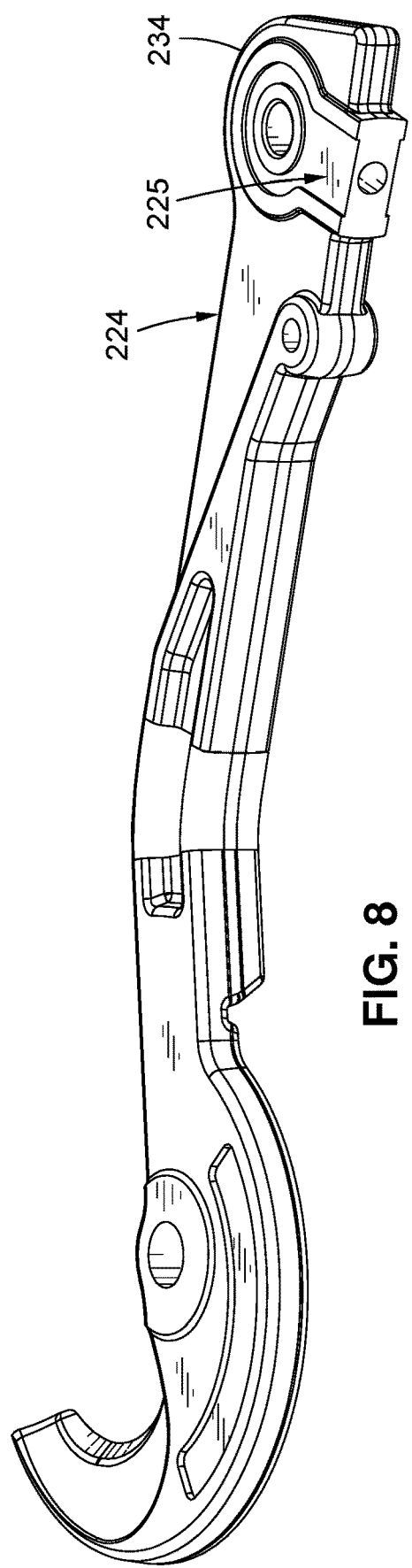
FIG. 8 shows a handle piece of a tool with folding handles according to an exemplary embodiment.

In one embodiment the latch of the folding handle preferably comprises a means for guiding the locking pin. As indicated above, such a means may comprise a guide, such as a guide pin. However, FIG. 8 shows an exemplary main handle 224 with another means for guiding the locking pin. In this embodiment, a track 225, such as in the form of a slot or indentation, is provided on one or both sides of the distal end 234 thereof. In the embodiment illustrated, the track 225 is linear and accepts therein a portion of the locking pin (not shown), whereby the locking pin is guided along the track to aid in its movement between its engaged and disengaged positions with the handle extension. Other means for guiding the locking pin, preferably so that the locking pin is constrained primarily to linear movement towards and away from the handle extension, might be utilized.

The invention has a number of advantages and benefits.

In one embodiment, the latch is located on the inside of the handles. By positioning the latch portions on the inside of the handle pieces, damage to the latch portions may be prevented.

In one embodiment, the ends of the locking pins 42 may be tapered to easily fit within the grooves while simultaneously reducing slack between the projections and the grooves. The latch may be formed from a cast steel or zinc alloy.

In one embodiment, the locking pin is configured to move linearly, such as along the guide and/or along/in the track. This constraint in movement of the locking pin to a linear motion reduces accidental disengagement of the locking pin from the notches.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A folding handle for a cutting tool comprising:
a main handle having a proximal end and a distal end, a tool head located at said proximal end;
a handle extension having a proximal end and a distal end, said proximal end of said handle extension rotatably connected to said distal end of said main handle, said handle extension rotatable between a first extended position and a second folded position relative to said main handle; and
a latching mechanism, said latching mechanism comprising:
a locking pin; and
an actuator connected to said locking pin, said actuator movable between a first position in which said locking pin engages said handle extension, preventing movement of said handle extension relative to said main handle, and a second position in which said locking pin is disengaged from said handle extension, allowing movement of said handle extension relative to said main handle,
wherein said actuator and locking pin are mounted to said main handle for movement relative to said main handle and wherein said movement of said actuator between said first and second positions relative to said main handle results in engagement of said locking pin with and disengagement of said locking pin from said handle extension, wherein said actuator comprises a control lever, wherein said control lever extends from said locking pin towards said tool head both when said handle extension is in the first extended position and when said handle extension is in the second folded position.

2. The folding handle in accordance with claim 1, wherein said tool head comprises a cutting head.

3. The folding handle in accordance with claim 1, wherein said locking pin is mounted for linear movement along a guide extending from said main handle.

4. The folding handle in accordance with claim 1, wherein said handle extension has at least one first notch and at least one second notch, wherein when said locking pin engages said at least one first notch, said locking pin locks said handle extension in said first extended position and when said locking pin engages said at least one second notch, said locking pin locks said handle extension in said second folded position.

5. The folding handle in accordance with claim 1, wherein said control lever has a proximal end, a distal end connected to said locking pin, and is pivotally connected to said main handle between said proximal and distal ends thereof.

6. The folding handle in accordance with claim 5, further comprising a spring for biasing said distal end of said control lever with respect to said proximal end thereof, said spring engaging said proximal end of said control lever.

7. The folding handle in accordance with claim 1, wherein said actuator is biased to said first position.

8. The folding handle in accordance with claim 1, wherein said proximal end of said handle extension comprises a first extension and a second extension and said distal end of said main handle is located between said first and second extensions.

9. The folding handle in accordance with claim 1, wherein in said folded position said distal end of said handle extension is folded towards said proximal end of said main handle.

10. A cutting tool having folding handles, comprising:
a first handle comprising:
a first main handle having a proximal end and a distal end, a first tool head located at said proximal end;
a first handle extension having a proximal end and a distal end, said proximal end of said first handle extension rotatably connected to said distal end of said first main handle, said first handle extension rotatable between a first extended position and a second folded position relative to said first main handle; and
a first latching mechanism, said first latching mechanism comprising:
a first locking pin mounted to said first main handle for movement relative to said first main handle; and
a first actuator movably mounted to said first main handle and connected to said first locking pin, said first actuator movable between a first position in which said first locking pin engages said first handle extension, preventing movement of said first handle extension relative to said first main handle, and a second position in which said first locking pin is disengaged from said first handle extension, allowing movement of said first handle extension relative to said first main handle;
a second handle comprising:
a second main handle having a proximal end and a distal end, a second tool head located at said proximal end;
a second handle extension having a proximal end and a distal end, said proximal end of said second handle extension rotatably connected to said distal end of said second main handle, said second handle extension rotatable between a first extended position and a second folded position relative to said second main handle; and
a second latching mechanism, said second latching mechanism comprising:
a second locking pin mounted to said second main handle for movement relative to said second main handle; and
a second actuator movably mounted to said second main handle and connected to said second locking pin, said second actuator movable between a first position in which said second locking pin engages said second handle extension, preventing movement of said second handle extension relative to said second main handle, and a second position in which said second locking pin is disengaged from said second handle extension, allowing movement of said second handle extension relative to said second main handle;
said first and second main handles movably connected to one another, wherein each of said first and second actuators comprises a control lever, wherein each said control lever extends from said respective first and second locking pins towards said tool head both when said first and second handle extensions are in the first extended position and when said first and second handle extensions are in the second folded position.

11. The cutting tool in accordance with claim 10, wherein said tool comprises a cutting tool and said first and second tool heads comprise cutting elements.

12. The cutting tool in accordance with claim 10, wherein when said first and second handle extensions are moved to said second folded position, said distal ends of said first and second handle extensions are rotated towards said proximal ends of said first and second main handles.

13. The cutting tool in accordance with claim 10, wherein said, said first main handle has a first side facing said second main handle and said second main handle has a first side facing said first main handle, said first locking pin and first actuator located at said first side of said first main handle and second locking pin and said second actuator located at said first side of said second main handle.

14. The cutting tool in accordance with claim 13, wherein said first main handle has a second side opposite said first side and said first handle extension extends along said second side when in said folded position and said second main handle has a second side opposite said first side and said second handle extension extends along said second side when in said folded position.

15. The cutting tool in accordance with claim 10, wherein said distal end of said first main handle comprises a stop which engages a face of said first handle extension when said first handle extension is located in said extended position.

16. The cutting tool in accordance with claim 10, wherein said distal end of said first handle extension comprises a first tool grip and said distal end of said second handle extension comprises a second tool grip.

17. The cutting tool in accordance with claim 10, wherein said first and second handles are pivotally connected.

18. The cutting tool in accordance with claim 10, wherein said first locking pin is mounted for linear movement to said first main handle and selectively engages a first notch on said first handle extension when said first handle extension is in said extended position and selectively engages a second notch on said first handle extension when said first handle extension is in said folded position and wherein said second locking pin is mounted for linear movement to said second main handle and selectively engages a first notch on said second handle extension when said second handle extension is in said extended position and selectively engages a second notch on said second handle extension when said second handle extension is in said folded position.

* * * * *